United States Patent
Cotto (10) Patent No.: US 12,377,703 B2
(45) Date of Patent: Aug. 5, 2025

(54) METHOD FOR CONTROLLING VARIABLE DAMPING SUSPENSIONS

(71) Applicant: WAY ASSAUTO SRL, Asti (IT)

(72) Inventor: Fabio Cotto, Turin (IT)

(73) Assignee: WAY ASSAUTO SRL, Asti (IT)

( * ) Notice: Subject to any disclaimer, the term of this patent is extended or adjusted under 35 U.S.C. 154(b) by 121 days.

(21) Appl. No.: 18/554,223

(22) PCT Filed: Apr. 6, 2022

(86) PCT No.: PCT/IB2022/053228
§ 371 (c)(1),
(2) Date: Oct. 6, 2023

(87) PCT Pub. No.: WO2022/215003
PCT Pub. Date: Oct. 13, 2022

(65) Prior Publication Data
US 2024/0116325 A1    Apr. 11, 2024

(30) Foreign Application Priority Data

Apr. 9, 2021    (IT) .......................... 102021000008927

(51) Int. Cl.
*B60G 17/08*    (2006.01)

(52) U.S. Cl.
CPC ........ *B60G 17/08* (2013.01); *B60G 2400/104* (2013.01); *B60G 2400/106* (2013.01); *B60G 2500/102* (2013.01)

(58) Field of Classification Search
CPC .. B60G 17/018; B60G 17/0162; F16F 15/002
See application file for complete search history.

(56) References Cited

U.S. PATENT DOCUMENTS

| | | |
|---|---|---|
| 5,096,219 A | 3/1992 | Hanson et al. |
| 5,721,681 A | 2/1998 | Borschert et al. |
| 2009/0085309 A1* | 4/2009 | Hirao ................... B60G 17/015 280/5.503 |
| 2009/0234537 A1* | 9/2009 | Tomida .................. B60G 17/08 701/38 |

(Continued)

FOREIGN PATENT DOCUMENTS

| | | |
|---|---|---|
| EP | 0421065 A2 | 4/1991 |
| GB | 2265201 A | 9/1993 |

OTHER PUBLICATIONS

International Search Report and Written Opinion for Corresponding International Application No. PCT/IB2022/053228, 10 pages, Aug. 8, 2022.

*Primary Examiner* — Long T Tran
(74) *Attorney, Agent, or Firm* — LUCAS & MERCANTI, LLP (57) ABSTRACT

A method for controlling a suspension system for a vehicle to obtain optimal parameters for the damping coefficients of the vehicle suspension that minimize acceleration along a heave axis, angular acceleration around a roll axis and angular acceleration around a pitch axis is provided. These parameters may be recorded during the tuning phase or may also be continuously obtained during use of the vehicle by an end user. Also disclosed is a suspension system for a vehicle configured to advantageously operate according to the method.

16 Claims, 4 Drawing Sheets

(56) References Cited

U.S. PATENT DOCUMENTS

| | | | |
|---|---|---|---|
| 2014/0353934 A1* | 12/2014 | Yabumoto | B60G 17/018 280/5.515 |
| 2019/0241038 A1* | 8/2019 | Katsuyama | B60G 17/01908 |
| 2019/0255903 A1* | 8/2019 | Hirao | B60G 17/08 |
| 2021/0001835 A1* | 1/2021 | Kanda | B62D 6/003 |
| 2022/0024464 A1* | 1/2022 | Katsuyama | B60W 40/13 |
| 2022/0032711 A1* | 2/2022 | Lee | B60G 17/0182 |
| 2022/0176766 A1* | 6/2022 | Kikuchi | B60G 17/016 |

\* cited by examiner

METHOD FOR CONTROLLING VARIABLE DAMPING SUSPENSIONS

CROSS-REFERENCE TO RELATED APPLICATIONS

This application is a 371 of PCT/IB2022/053228, filed Apr. 6, 2022, which claims the benefit of Italian Patent Application No. 102021000008927, filed Apr. 9, 2021.

TECHNICAL FIELD

The present description relates to the field of vehicle suspensions and more specifically the correct setting and control of adaptive or semi-active suspensions, i.e. suspensions with variable damping coefficient.

BACKGROUND OF THE INVENTION

Adaptive or semi-active suspensions are a type of suspension that allows the damping coefficient of the damper to be varied. Unlike active suspensions, semi-active or adaptive suspensions do not add energy to the system and can only vary the intensity of the force opposing the relative movement between body and wheel, not the direction of the force.

Semi-active suspensions may have either very fast or slow time constants. Regardless of this characteristic, the values of the damping coefficients as a function of the velocity and of the road surface conditions are generally defined in a tuning step before a vehicle, or a line of vehicles, is marketed. However, this tuning phase requires lengthy tests by specialized operators on different types of roads under different conditions (in terms of weather, velocity, etc.), and leads to the definition of parameters that are, at least partly, subjective. Moreover, during the use of the vehicle these parameters, which depend on the road conditions, on the velocity and on the driving mode set by the driver, cannot be modified and therefore are not generally the optimal parameters.

SUMMARY OF THE INVENTION

It is the object of the invention to provide a method for controlling a suspension system for a vehicle so as to obtain optimal parameters for the damping coefficients of the vehicle suspension that minimize acceleration along a vertical motion axis (Z), angular acceleration around a roll axis (X) and angular acceleration around a pitch axis (Y).

These parameters can be recorded during the tuning phase or can also be continuously obtained while the vehicle is being used by an end user.

Thanks to steps i) to vi) of the attached claim 1 it is possible to obtain such optimal parameters for the vehicle suspension. Dependent claims 2-15 define additional steps of the method that help to further improve the definition of the optimal parameters.

A further object of the present invention is to provide a suspension system for a vehicle configured to advantageously operate according to the above-mentioned method.

BRIEF DESCRIPTION OF THE DRAWINGS

Further advantages and features of the method for controlling a vehicle suspension system and of the vehicle suspension system according to the present invention will be apparent to those skilled in the art from the following detailed and non-limiting description, with reference to the accompanying drawings in which.

DETAILED DESCRIPTION

Figure 1:
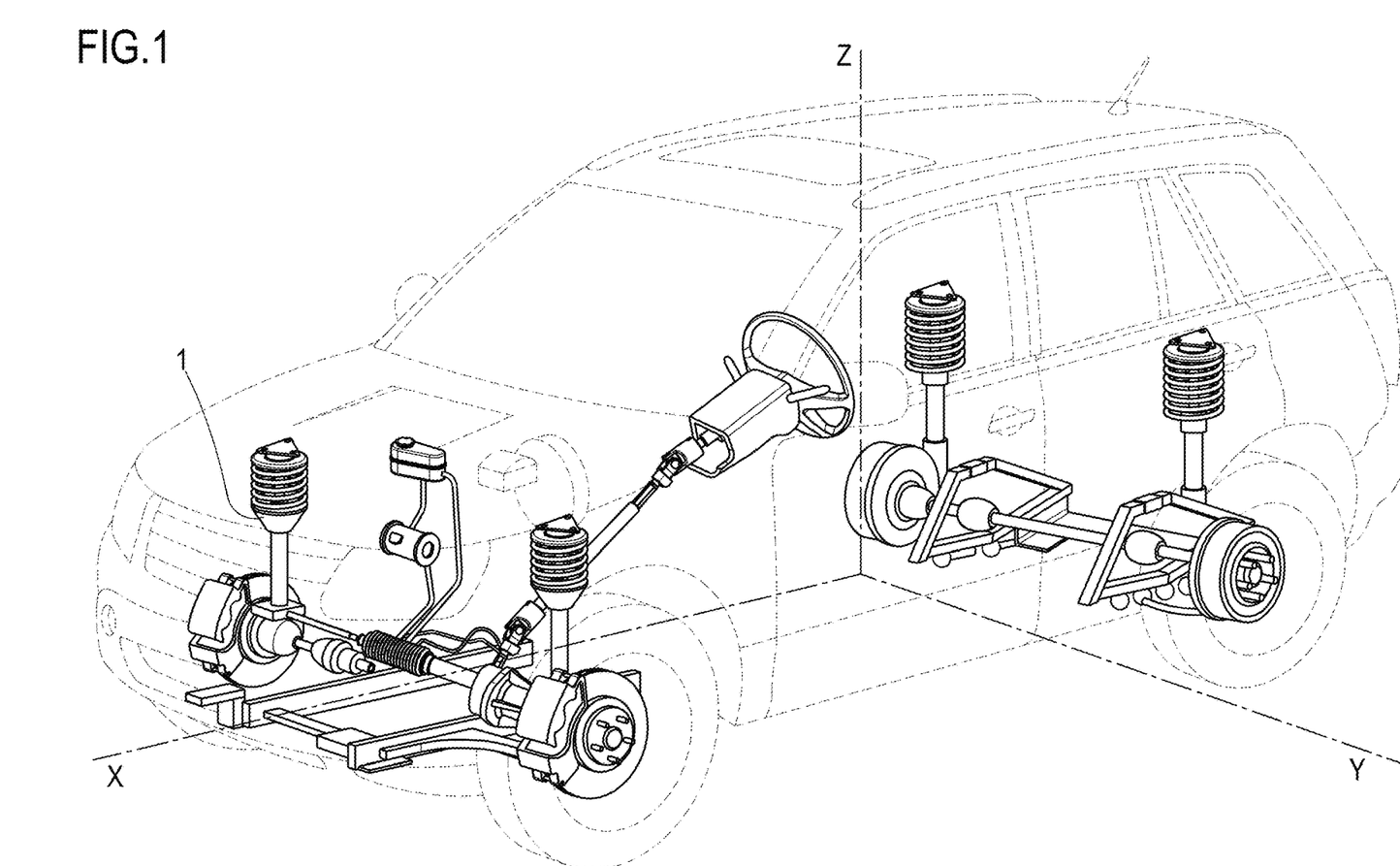
FIG. 1 shows a schematic view of a vehicle suspension system.

Referring to FIG. 1, a suspension system for a vehicle V comprises:

- a plurality of semi-active dampers 1, which are interposed each between a body B and a respective wheel W of the vehicle V and are configured to change their damping coefficient in response to a control signal;
- sensors 2 for obtaining a current measurement of an acceleration $h(t=0)$ of the vehicle (V) along a vertical motion ("heave") axis (Z), of an angular acceleration $r(t=0)$ of the vehicle (V) around a roll axis (X) and of an angular acceleration $p(t=0)$ of the vehicle (V) around a pitch axis (Y);
- a memory module configured to store at least M+1 acceleration measurement values $h(t=0, t=-1, \ldots, t=-M)$, $r(t=0, t=-1, \ldots, t=-M)$, $p(t=0, t=-1, \ldots, t=-M)$ of the vehicle (V)
- a controller functionally connected with the dampers 1 and the memory module.

The controller is configured to send a respective control signal to each damper 1 to adjust the damping coefficient. In particular, a damping force of each damper 1 is a function of said damping coefficient of each damper 1 and of a difference between the velocity of the body B and the respective wheel W along a damping direction of the damper 1. Since the dampers 1 are of a semi-active type, the damping force is always directed in the opposite direction with respect to the relative movement between the body B and the respective wheel W. The controller is configured to implement a method for controlling the suspension system defined as follows.

Figure 2:
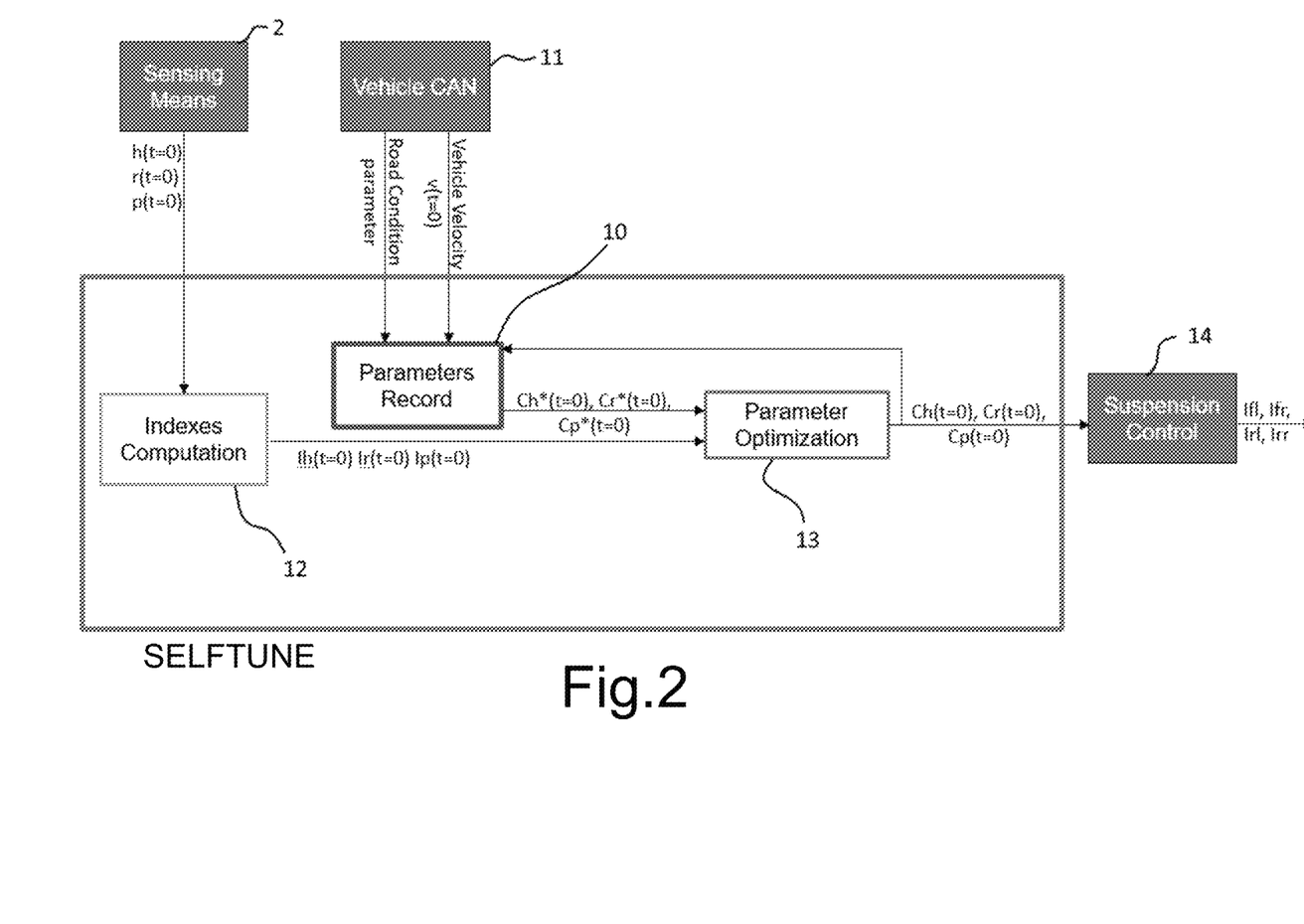
FIG. 2 shows a block diagram of a mode for carrying out a method for controlling a vehicle suspension system.
Figure 3:
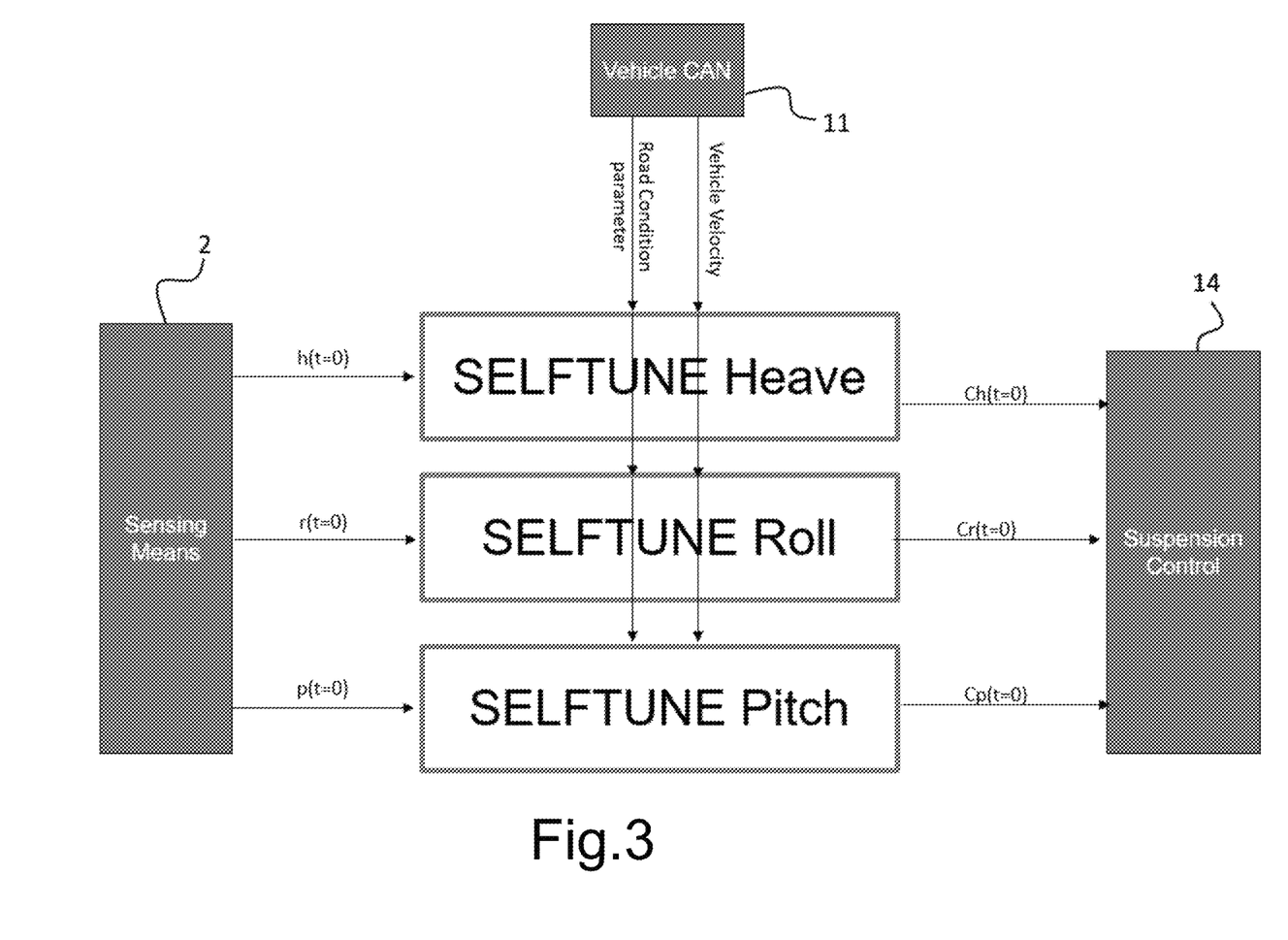
FIG. 3 shows a block diagram of the method of FIG. 2, divided in terms of heave damping coefficient Ch, roll damping coefficient Cr and pitch damping coefficient Cp.

Referring to FIGS. 2 and 3, the method provides for performing, at each cycle of the method, i.e. at each time instant, six steps i)-vi) described in detail below.

The first step i) consists in acquiring the current acceleration values $h(t=0)$, $r(t=0)$, $p(t=0)$ of the vehicle V from the sensors 2.

The second step ii) consists in filtering these current acceleration values $h(t=0)$, $r(t=0)$, $p(t=0)$ of the vehicle V taking into account a number N of said past acceleration measurements $h(t=-1, \ldots, t=-N)$, $r(t=-1, \ldots, t=-N)$, $p(t=-1, \ldots, t=-N)$ of the vehicle, taken at previous cycles and stored in the memory module, to obtain current filtered acceleration values, the so-called indices, $Ih(t=0)$, $Ir(t=0)$, $Ip(t=0)$, where $N \leq M$.

The third step iii) consists in comparing each of the current filtered acceleration values $Ih(t=0)$, $Ir(t=0)$, $Ip(t=0)$ with the respective previous filtered acceleration values $Ih(t=-1)$, $Ir(t=-1)$, $Ip(t=-1)$.

The fourth step iv) consists in determining, based on the result of the comparison made during step iii), the sign of a variation step to be applied to a state of the heave damping coefficient Ch*, to a state of the roll damping coefficient Cr* and to a state of the pitch damping coefficient Cp*, respectively, each state being obtained based on previous output values of the heave damping coefficient Ch(t=−1), of the roll damping coefficient Cr(t=−1) and of the pitch damping coefficient Cp(t=−1), respectively, wherein the step of determining the sign of said variation step comprises the operation of verifying, for each of the states Ch*, Cr* and Cp*, if the current filtered acceleration values Ih(t=0), Ir(t=0), Ip(t=0) are greater than the respective filtered acceleration values Ih(t=−1), Ir(t=−1), Ip(t=−1) taken at the previous cycle and, if so, reversing the sign of said variation step with respect to the sign of the variation step at the previous cycle, otherwise keeping unchanged the sign of the previous variation step. In other words, at each cycle, the method includes the operation of generating a variation step to be added to the states Ch*, Cr*, Cp*. The sign of this variation step depends on the sign of the variation step at the previous step and on the comparison between the indices Ih, Ir, Ip at the current time and at time t=−1. For each index, if the current index is greater than the index at t=−1, then the sign of the variation step, to be added to the corresponding state, is inverted with respect to the sign of the variation step determined at the previous cycle.

The fifth step v) consists in obtaining current values of the heave damping coefficient Ch(t=0), of the roll damping coefficient Cr(t=0) and of the pitch damping coefficient Cp(t=0) by summing each variation step calculated at step iv) with the respective values of the state of the heave damping coefficient Ch*, of the state of the roll damping coefficient Cr* and of the state of the pitch damping coefficient Cp*.

The sixth step vi) consists in transmitting to each damper 1 the respective control signal, which corresponds to a desired value of the damping coefficient, said desired value of the damping coefficient being based on the current values of the heave damping coefficient Ch(t=0), of the roll damping coefficient Cr(t=0) and of the pitch damping coefficient Cp(t=0) of the vehicle.

Referring to FIG. 2, step ii) is represented by the Indexes Computation block 12, while steps iii) to v) are represented by the Parameter Optimization block 13.

Steps ii)-v) define the so-called SELFTUNE algorithm according to the present invention.

In particular, FIG. 3 shows that the SELFTUNE algorithm is simultaneously executed three times starting from the current acceleration values h(t=0), r(t=0), p(t=0) of the vehicle provided by the sensors 2 to obtain the current heave damping coefficient Ch, the current roll damping coefficient Cr and the current pitch damping coefficient Cp.

The conversion from the current values of the heave damping coefficient Ch(t=0), of the roll damping coefficient Cr(t=0) and of the pitch damping coefficient Cp(t=0) to the desired values of the damping coefficients for each damper 1 is an operation known to those skilled in the art, which can be carried out in various ways. In FIG. 2 such an operation is represented by block 14.

An example of this known conversion is illustrated below in the case of a vehicle equipped with four dampers 1. The sensors 2 are configured to obtain, in addition to a measurement of the accelerations h, r, p, also a current measurement of the heave velocity, of the roll angular velocity and of the pitch angular velocity. The current parameters of Ch, Cr, Cp are multiplied by these heave, roll and pitch velocities, respectively, thereby obtaining a force along the axis Z (Fz) and two torques, one around the axis X (Mx) and the other around the axis Y (My). These forces are combined in the following way to obtain four desired forces for each damper (in order, the desired force on the left front damper, on the right front damper, on the left rear damper and on the right rear damper):

$F\_damper\_FL = Fz/4 + Mx/(T/2) - My/A$
$F\_damper\_FR = Fz/4 - Mx/(T/2) - My/A$
$F\_damper\_RL = Fz/4 + Mx/(T/2) + My/B$
$F\_damper\_RR = Fz/4 - Mx/(T/2) + My/B$, where T=track width of the vehicle, A=distance between front axle and centre of gravity, B=distance between rear axle and centre of gravity.

Finally, the controller is configured to control the driving currents $I_{FL}, I_{FR}, I_{RL}, I_{RR}$ required on each individual damper 1 to achieve the desired force determined above, based on the measured movement velocities of the single dampers.

In a first mode for carrying out the above-described method, the variation step has a fixed amplitude. Step iv) determines only the sign of the current variation step. Simulations and practical tests have shown that this fixed amplitude of the variation step is particularly advantageous when it is between 1% and 5% of the difference between the maximum and minimum values of the damping coefficient of the damper 1. It has been proved that the range 1-5% is particularly advantageous as a compromise between speed in reaching an optimum point and stability of the control system. The fixed-step mode has the advantage of being not very burdensome from a computational point of view and it is therefore suitable for reducing the costs for method implementation and/or increasing the frequency of execution of the method cycles with the same hardware.

In a second mode for carrying out the method, step iv) further comprises determining not only the sign, but also the amplitude of the variation step to be applied to the state of the heave damping coefficient Ch*, to the state of the roll damping coefficient Cr* and to the state of the pitch damping coefficient Cp*, respectively. Simulations and practical tests have shown that this variable amplitude of the variation step is particularly advantageous when it is between 1% and 20% of the difference between the maximum and minimum values of the damping coefficient of the damper 1. The range 1-20% for the variable-step mode of the method has proved to be particularly advantageous as a compromise between speed in reaching an optimum point and stability of the control system.

According to an aspect of this second mode of the method, step iv) of the method comprises the operation of checking whether the current filtered acceleration values Ih(t=0), Ir(t=0), Ip(t=0) are greater than the respective filtered acceleration values Ih(t=−1), Ir(t=−1), Ip(t=−1) taken at the previous cycle, then, if so, reducing the amplitude of the variation step with respect to the amplitude of the variation step at the previous cycle.

In this way, there is simultaneously, with respect to the previous step, a reversal of the sign and a reduction in the amplitude. Thanks to this feature, the method can advantageously progressively decrease the oscillation of the current values of Ch, Cr, Cp around the optimum value, thereby obtaining an asymptotically stable system.

Preferably, the operation of reducing the amplitude of said current variation step with respect to the amplitude of the variation step at the previous cycle reduces the step between 50% and 70% of the variation step at the previous cycle. Simulations and practical tests have shown that this range is particularly advantageous as a compromise between speed and system stability.

According to an aspect of this second mode of the method, step iv) of the method comprises the operation of checking whether the current filtered acceleration values Ih(t=0), Ir(t=0), Ip(t=0) are greater than the respective filtered acceleration values Ih(t=−1), Ir(t=−1), Ip(t=−1) taken at the previous cycle, then, if not, increasing the amplitude of the variation step with respect to the variation step at the previous cycle. In this way, with respect to the previous step, the sign is kept unchanged and at the same time the amplitude of the step is increased. Thanks to this feature, the method can advantageously increase the speed with which the region close to the optimum point is reached. Preferably, the operation of increasing the amplitude of the variation step with respect to the amplitude of the variation step of the previous cycle increases the step up to between 110% and 130% of the variation step of the previous cycle. Simulations and practical tests have shown that this range is particularly advantageous as a compromise between speed and overall system stability.

According to an aspect of both the first mode and the second mode of the method, the state of the heave damping coefficient Ch*, the state of the roll damping coefficient Cr* and the state of the pitch damping coefficient Cp* are equal to the output of the heave damping coefficient Ch(t=−1), to the output of the roll damping coefficient Cr(t=−1) and to the output of the pitch damping coefficient Cp(t=−1) at the previous cycle, respectively. The method thus implemented has the advantage of being computationally very simple and robust.

According to a further aspect, which applies both to the first mode and to the second mode of the method and is alternative to the first aspect set forth in the previous paragraph, the state of the heave damping coefficient Ch*, the state of the roll damping coefficient Cr* and the state of the pitch damping coefficient Cp* are respectively calculated based on the output of the heave damping coefficient Ch(t=−1) at the previous cycle, on the output of the roll damping coefficient Cr(t=−1) at the previous cycle and on the output of the pitch damping coefficient Cp(t=−1) at the previous cycle and on at least one current velocity v(t=0) of the vehicle V along the axis X. In other words, referring to FIG. 2, a Parameters Record module 10 determines the values of the current states Ch*, Cr*, Cp* as a function of the outputs of the coefficients Ch, Cr, Cp at t=−1 and based on a detected velocity of the vehicle V along the axis X, for example provided by a Controller Area Network bus 11 of the vehicle. Due to this feature of the method, the speed with which an optimum point is reached is greatly increased since the changes in the vehicle velocity during the execution of steps i) to vi) are taken into account.

Even more preferably, the state of the heave damping coefficient Ch*, the state of the roll damping coefficient Cr* and the state of the pitch damping coefficient Cp* are respectively calculated based on the output of the heave damping coefficient Ch(t=−1) at the previous cycle, on the output of the roll damping coefficient Cr(t=−1) at the previous cycle, on the output of the pitch damping coefficient Cp(t=−1) at the previous cycle, on the current velocity v(t=0) of the vehicle V along the axis X and on a parameter representing the road conditions. In other words, referring once again to FIG. 2, the Parameters Record module 10 determines the values of the current states Ch*, Cr*, Cp* as a function of the outputs of the coefficients Ch, Cr, Cp at the previous cycle, based on the detected velocity of the vehicle along the axis X, and based on parameters indicative of the road conditions, which parameters are for example also provided by the Controller Area Network bus 11 of the vehicle. These parameters indicative of the road conditions are parameters known to those skilled in the art, typically determined based on the stresses on the wheels. Thanks to this additional feature of the method, the speed with which an optimum point is reached is still further increased as changes in the vehicle velocity and in the road conditions during the execution of steps i) to vi) are taken into account.

For example, the state of the heave damping coefficient Ch*, the state of the roll damping coefficient Cr* and the state of the pitch damping coefficient Cp* are read from a lookup map using as the input of the lookup map the output of the heave damping coefficient Ch(t=−1) at the previous cycle, the output of the roll damping coefficient Cr(t=−1) at the previous cycle, the output of the pitch damping coefficient Cp(t=−1) at the previous cycle, the current velocity v(t=0) of the vehicle V along the axis X and a parameter representative of the road conditions.

Figure 4:
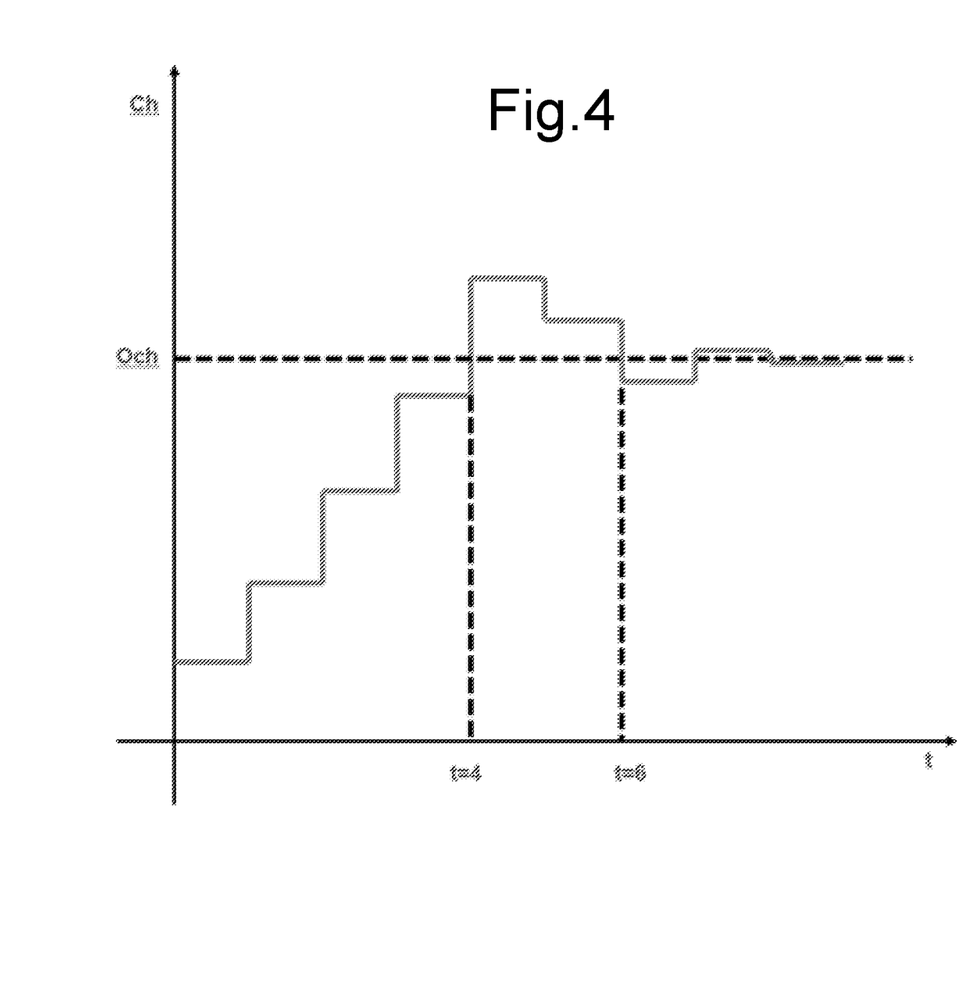
FIG. 4 shows a graph representing an example of behaviour of the heave damping coefficient Ch.

Referring now to FIG. 4, an example of the behaviour of the heave damping coefficient Ch from t=0 to t=8 may be observed. At time t=4 and t=6 the steps iii) to v) produce the same sign of the variation steps as the variation steps at the previous times t=3 and t=5. On the contrary, at time t=5 and t=7 the sign of the variation step is reversed with respect to that of the respective variation steps at previous times t=4 and t=6. It can also be observed that the amplitude of the variation step at time t=4 and time t=6 is greater than the amplitude of the variation steps at the respective previous times t=3 and t=5. Again, it can be observed that the amplitude of the variation step at time t=5 is much smaller than the amplitude of the variation step at time t=4. Finally, in FIG. 4 it can be observed on the axis of the ordinates a value of the heave damping coefficient Ch "Och" which represents a hypothetical optimum value to which the current value of the heave damping coefficient Ch tends thanks to the repetition, at each increase in the time value, of the control method according to the present invention.

According to an aspect, which applies to any of the modes for carrying out the method presented so far, the current filtered acceleration values Ih(t=0), Ir(t=0), Ip(t=0) are either the average of the absolute amplitude values of the N+1 respective current and past acceleration measurements h(t=0, t=−1, . . . , t=−N), r(t=0, t=−1, . . . , t=−N), p(t=0, t=−1, . . . , t=−N) or the root mean square of the respective N+1 current and past acceleration measurements h(t=0, t=−1, . . . , t=−N), r(t=0, t=−1, . . . , t=−N), p(t=0, t=−1, . . . , t=−N).

Alternatively, the current filtered acceleration values, the so-called indexes, Ih(t=0), Ir(t=0), Ip(t=0) are computed through a weighted sum between a low frequency component, between 0 and 3 Hz, and a high frequency component, between 3 and 20 Hz, of the respective N+1 current and past acceleration measurements h(t=0, t=−1, . . . , t=−N), r(t=0, t=−1, . . . , t=−N), p(t=0, t=−1, . . . , t=−N) transposed in the frequency domain.

Furthermore, the number N of measurements, used in step ii) to filter the current acceleration values h(t=0), r(t=0), p(t=0) of the vehicle, is a function of the vehicle velocity, wherein the higher the vehicle velocity the lower the number N of measurements.

According to an aspect applicable to any of the modes for carrying out the method presented so far, the method also comprises the step of storing in a memory, at regular intervals or under certain conditions, optimal damping coefficients Ch, Cr, Cp so that they can be used in the future to speed up the control under similar velocity and road conditions or to directly replace the control with a lookup table of coefficients depending on road conditions and velocity, e.g., in case the method is used only in the tuning phase of the vehicle before it is offered for sale to the end user.

Variations or additions may be made by those skilled in the art to the modes for carrying out the method described and illustrated herein, while remaining within the scope of the following claims. In particular, further modes of the method may comprise the technical features of any one of the following claims with the addition of one or more technical features described in the specification or illustrated in the drawings, taken either individually or in any combination thereof.

DESCRIPTION OF THE TERMS USED IN THE DRAWINGS

| FIG. 2 | |
|---|---|
| Sensing Means | Sensors |
| Vehicle CAN | Controller Area Network bus of the vehicle |
| Road Condition Parameter | Parameter representing road conditions |
| Vehicle Velocity | Velocity of the vehicle |
| Parameters Record | Register of the parameters |
| Indexes Computation | Computation of the indexes |
| Parameter Optimization | Optimization of the parameter |
| Suspension Control | Control of the suspension |
| SELFTUNE | Self-adjustment |
| FIG. 3 | |
| Vehicle CAN | Controller Area Network bus of the vehicle |
| Road Condition Paramenter | Parameter representing road conditions |
| Vehicle Velocity | Velocity of the vehicle |
| Sensing Means | Sensors |
| SELFTUNE Heave | Self-adjustment of the heave motion |
| SELFTUNE Roll | Self-adjustment of the roll motion |
| SELFTUNE Pitch | Self-adjustment of the pitch motion |
| Suspension Control | Control of the suspension |

The invention claimed is:

1. A method for controlling a suspension system for a vehicle, wherein the suspension system comprises:
   a plurality of semi-active dampers which are interposed each between a body and a respective wheel of the vehicle and are configured to change their damping coefficient in response to a control signal, wherein a damping force of each damper is a function of the respective damping coefficient and of the difference between a velocity of the body and a velocity of the respective wheel along a damping direction of the damper;
   sensors for acquiring a current measurement of an acceleration $h(t=0)$ of the vehicle along a heave axis, of an angular acceleration $r(t=0)$ of the vehicle around a roll axis and of an angular acceleration $p(t=0)$ of the vehicle around a pitch axis;
   a memory module configured to store at least M+1 acceleration measurement values $h(t=0, t=-1, \ldots, t=-M)$, $r(t=0, t=-1, \ldots, t=-M)$, $p(t=0, t=-1, \ldots, t=-M)$ of the vehicle;
   a controller functionally connected with said dampers and with said memory module, the controller being configured to send a respective control signal to each damper to adjust the respective damping coefficient of the latter,
the method comprising cyclically carrying out the steps of:
   i) at each cycle of the method, acquiring current acceleration values $h(t=0)$, $r(t=0)$, $p(t=0)$ of the vehicle (V) from said sensors (2);
   ii) filtering said current acceleration values $h(t=0)$, $r(t=0)$, $p(t=0)$ of the vehicle taking into account a number N of past acceleration measurements $h(t=-1, \ldots, t=-N)$, $r(t=-1, \ldots, t=-N)$, $p(t=-1, \ldots, t=-N)$ of the vehicle, taken at previous cycles and stored in the memory module, to obtain current filtered acceleration values, so-called indexes, $Ih(t=0)$, $Ir(t=0)$, $Ip(t=0)$, wherein $N \leq M$;
   iii) comparing each of the current filtered acceleration values $Ih(t=0)$, $Ir(t=0)$, $Ip(t=0)$ with the respective previous filtered acceleration values $Ih(t=-1)$, $Ir(t=-1)$, $Ip(t=-1)$;
   iv) based on the result of the comparison in step iii), determining the sign of a variation step to be applied to a state of the heave damping coefficient $Ch^*$, to a state of the roll damping coefficient $Cr^*$ and to a state of the pitch damping coefficient $Cp^*$, respectively, each state being obtained on previous output values of the heave damping coefficient $Ch(t=-1)$, of the roll damping coefficient $Cr(t=-1)$ and of the pitch damping coefficient $Cp(t=-1)$, respectively, wherein said step of determining the sign of said variation step comprises the operation of checking, for each of the states $Ch^*$, $Cr^*$ and $Cp^*$, if the current filtered acceleration values $Ih(t=0)$, $Ir(t=0)$, $Ip(t=0)$ are greater than the respective filtered acceleration values $Ih(t=-1)$, $Ir(t=-1)$, $Ip(t=-1)$ taken at the previous cycle and, if so, reversing the sign of said variation step with respect to the sign of the variation step at the previous cycle, otherwise keeping unchanged the sign of the previous variation step;
   v) obtaining current values of the heave damping coefficient $Ch(t=0)$, of the roll damping coefficient $Cr(t=0)$ and of the pitch damping coefficient $Cp(t=0)$ by summing each variation step with the respective values of the state of the heave damping coefficient $Ch^*$, of the state of the roll damping coefficient $Cr^*$ and of the state of the pitch damping coefficient $Cp^*$; and
   vi) transmitting to each damper said respective control signal which corresponds to a desired value of the damping coefficient, said desired value of the damping coefficient being based on the current values of the heave damping coefficient $Ch(t=0)$, of the roll damping coefficient $Cr(t=0)$ and of the pitch damping coefficient $Cp(t=0)$ of the vehicle.

2. The method according to claim 1, wherein step iv) also comprises determining the amplitude of said variation step to be applied to said state of the heave damping coefficient $Ch^*$, to said state of the roll damping coefficient $Cr^*$ and to said state of the pitch damping coefficient $Cp^*$, respectively.

3. The method according to claim 2, wherein determining the amplitude of said variation step to be applied to said state of the heave damping coefficient $Ch^*$, to said state of the roll damping coefficient $Cr^*$ and to said state of the pitch damping coefficient $Cp^*$, respectively, comprises the operation of checking whether the current filtered acceleration values $Ih(t=0)$, $Ir(t=0)$, $Ip(t=0)$ are greater than the respective filtered acceleration values $Ih(t=-1)$, $Ir(t=-1)$, $Ip(t=-1)$ taken at the previous cycle, then, if so, reducing the amplitude of said variation step with respect to the amplitude of the variation step at the previous cycle.

4. The method according to claim 3, wherein the operation of reducing the amplitude of said variation step with respect to the amplitude of the variation step at the previous cycle reduces the variation step between 50% and 70% of the variation step at the previous cycle.

5. The method according to claim 2, wherein determining the amplitude of said variation step to be applied to said state of the heave damping coefficient $Ch^*$, to said state of the roll damping coefficient $Cr^*$ and to said state of the pitch damping coefficient $Cp^*$, respectively, comprises the operation of checking whether the current filtered acceleration values $Ih(t=0)$, $Ir(t=0)$, $Ip(t=0)$ are greater than the respective filtered acceleration values Ih(t=−1), Ir(t=−1), Ip(t=−1) taken at the previous cycle, then, if not, increasing the amplitude of said variation step with respect to the amplitude of the variation step at the previous cycle.

6. The method according to claim 5, wherein the operation of increasing the amplitude of said variation step with respect to the amplitude of the variation step at the previous cycle increases the variation step between 110% and 130% of the variation step at the previous cycle.

7. The method according to claim 1, wherein said variation step has a fixed amplitude comprised between 1% and 5% of the difference between the maximum and minimum values of the damping coefficient of each damper.

8. The method according to claim 1, wherein said variation step has a variable amplitude comprised between 1% and 20% of the difference between the maximum and minimum values of the damping coefficient of each damper.

9. The method according to claim 1, wherein the state of the heave damping coefficient Ch*, the state of the roll damping coefficient Cr* and the state of the pitch damping coefficient Cp* are equal to the output of the heave damping coefficient Ch(t=−1), to the output of the roll damping coefficient Cr(t=−1) and to the output of the pitch damping coefficient Cp(t=−1) at the previous cycle, respectively.

10. The method according to claim 1, wherein the state of the heave damping coefficient Ch*, the state of the roll damping coefficient Cr* and the state of the pitch damping coefficient Cp* are computed based on the output of the heave damping coefficient Ch(t=−1), on the output of the roll damping coefficient Cr(t=−1) and on the output of the pitch damping coefficient Cp(t=−1) at the previous cycle, respectively, and based on least one current velocity v(t=0) of the vehicle along said roll axis (X).

11. The method according to claim 10, wherein the state of the heave damping coefficient Ch*, the state of the roll damping coefficient Cr* and the state of the pitch damping coefficient Cp* are computed based on the output of the heave damping coefficient Ch(t=−1), on the output of the roll damping coefficient Cr(t=−1) and on the output of the pitch damping coefficient Cp(t=−1) at the previous cycle, respectively, on the current velocity v(t=0) of the vehicle along said roll axis and on a parameter representing the road conditions.

12. The method according to claim 11, wherein the state of the heave damping coefficient Ch*, the state of the roll damping coefficient Cr* and the state of the pitch damping coefficient Cp* are read from a lookup map using as input of the lookup map the output of the heave damping coefficient Ch(t=−1), the output of the roll damping coefficient Cr(t=−1) and the output of the pitch damping coefficient Cp(t=−1) at the previous cycle, the current velocity v(t=0) of the vehicle along said roll axis and a parameter representing the road conditions.

13. The method according to claim 1, wherein said current filtered acceleration values Ih(t=0), Ir(t=0), Ip(t=0) are either the average of the absolute amplitude values of the N+1 respective current and past acceleration measurements h(t=0, t=−1, . . . , t=−N), r(t=0, t=−1, . . . , t=−N), p(t=0, t=−1, . . . , t=−N) or the root mean square of the respective N+1 current and past acceleration measurements h(t=0, t=−1, . . . , t=−N), r(t=0, t=−1, . . . , t=−N), p(t=0, t=−1, . . . , t=−N).

14. The method according to claim 1, wherein said current filtered acceleration values, so-called indexes, Ih(t=0), Ir(t=0), Ip(t=0) are computed through a weighted sum between a low frequency component, between 0 and 3 Hz, and a high frequency component, between 3 and 20 Hz, of the respective N+1 current and past acceleration measurements h(t=0, t=−1, . . . , t=−N), r(t=0, t=−1, . . . , t=−N), p(t=0, t=−1, . . . , t=−N) transposed in the frequency domain.

15. The method according to claim 1, wherein the number N of measurements used in said step ii) to filter the current acceleration values h(t=0), r(t=0), p(t=0) of the vehicle is a function of the vehicle velocity, wherein the higher the vehicle velocity the lower the number N of measurements.

16. A suspension system for a vehicle, wherein the suspension system comprises:
a plurality of semi-active dampers which are interposed each between a body and a wheel of the vehicle and are configured to change their damping coefficient in response to a control signal, wherein a damping force of each damper is a function of the respective damping coefficient and the difference between a velocity of the body and a velocity of the respective wheel along a damping direction of the damper;
sensors for acquiring a current measurement of an acceleration h(t=0) of the vehicle along a heave axis, of an angular acceleration r(t=0) of the vehicle around a roll axis and of an angular acceleration p(t=0) of the vehicle around a pitch axis;
a memory module configured to store at least M+1 acceleration measurement values h(t=0, t=−1, . . . , t=−M), r(t=0, t=−1, . . . , t=−M), p(t=0, t=−1, . . . , t=−M) of the vehicle;
a controller functionally connected with said dampers and with said memory module, the controller being configured to send a respective control signal to each damper to adjust said damping coefficient, wherein said controller is configured to implement the method of claim 1.

* * * * *